US005694684A

United States Patent [19]

Yamamoto

[11] Patent Number: 5,694,684

[45] Date of Patent: Dec. 9, 1997

[54] MANUFACTURING METHOD FOR INK JET RECORDING HEAD

[75] Inventor: Hajime Yamamoto, Yokohama, Japan

[73] Assignee: Canon Kabushiki Kaisha, Tokyo, Japan

[21] Appl. No.: 487,564

[22] Filed: Jun. 7, 1995

[30] Foreign Application Priority Data

Jun. 10, 1994 [JP] Japan .................................... 6-128612

[51] Int. Cl.[6] .................................. B41J 2/14; B41J 2/16; B29C 45/17

[52] U.S. Cl. ............................ 29/890.1; 216/27; 347/47; 347/57; 347/65

[58] Field of Search ........................... 29/890.1, DIG. 29; 156/272.8; 219/121.6; 264/272.11; 216/65, 27; 347/40, 45, 47, 56, 57, 65, 66

[56] References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/57 X |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,723,129 | 2/1988 | Endo et al. | 347/57 X |
| 4,740,796 | 4/1988 | Endo et al. | 347/56 |
| 5,157,420 | 10/1992 | Naka et al. | 347/40 |
| 5,208,604 | 5/1993 | Watanabe et al. | 347/47 |
| 5,361,087 | 11/1994 | Tajima et al. | 347/47 X |
| 5,365,255 | 11/1994 | Inoue et al. | 347/45 |
| 5,419,697 | 5/1995 | Hirano et al. | 347/65 X |
| 5,508,725 | 4/1996 | Goto et al. | 347/65 |

FOREIGN PATENT DOCUMENTS

| | | | |
|---|---|---|---|
| 54-56847 | 5/1979 | Japan . | |
| 59-123670 | 7/1984 | Japan . | |
| 59-138461 | 8/1984 | Japan . | |
| 60-71260 | 4/1985 | Japan . | |
| 62-118991 | 5/1987 | Japan | 29/890.1 |
| 62-286695 | 12/1987 | Japan | 29/890.1 |
| 4-348043 | 12/1992 | Japan | 216/65 |

*Primary Examiner*—Peter Vo

*Attorney, Agent, or Firm*—Fitzpatrick, Cella, Harper & Scinto

[57] ABSTRACT

A manufacturing method for an ink jet recording head comprising ink ejection outlets, ink passages in fluid communication with the ink ejection outlets, an ink chamber for supplying ink to the ink passages, energy generating elements for ejecting ink, a grooved top plate having ink passage walls, an ink chamber frame for defining the ink passages and the ink chamber and the ink ejection outlets, a substrate for supporting the energy generating elements, wherein the ink passages and ink chamber are formed by coupling the grooved top plate and the substrate, the improvement residing in that the grooved top plate is molded, and after the molding, a laser machining is effected to a neighborhood of a connecting portion between the ink chamber frame and a passage wall.

14 Claims, 13 Drawing Sheets

L > 20·h

MANUFACTURING METHOD FOR INK JET RECORDING HEAD

FIELD OF THE INVENTION AND RELATED ART

The present invention relates to a manufacturing method for an ink jet recording head for forming an image on a recording material by ejecting ink droplets, more particularly to a method of forming ink passages and ink ejection outlets.

Ink jet recording heads of various structures, usable with an ink jet recording apparatus in which an image is formed by ejecting ink droplets onto a recording material, are commercially available. An example of such an ink jet recording head is shown in FIG. 2 as an exploded perspective view. FIG. 3 is a sectional view taken along an ink passage of an ink jet recording head.

On a silicon substrate, there are provided energy generating elements (not shown) for generating energy for ejecting the ink. The silicon substrate 1 is bonded with a bonding material 4 having a high thermal conductivity, on an aluminum plate 27 to promote heat radiation from the silicon substrate 1 an orifice plate 23 is provided with ejection outlets 14 for ejecting the ink, is integral with a top plate 11 having recesses to constitute a liquid chamber 12 for containing ink to be supplied to the ejection outlets 14 and ink passages 28 for fluid communication between the liquid chamber 12 and the ejection outlets 14.

The top plate 11 is provided with an ink supply port 10 in fluid communication with the recess to constitute the liquid chamber 12. Through the supply port 10, the ink is supplied to the liquid chamber 12 from the outside of the recording head.

The top plate 11 is coupled with substrate 1 so that the energy generating elements and the ink passages 28 correspond with each other, respectively, and the top plate 11 and the substrate 1 are fixed by a confining spring 26, thus constituting the ink passages 28 and the liquid chamber 12.

FIG. 1 is an enlarged schematic view of the top plate 11.

As described above, the top plate 11 is integral with an orifice plate 15 having ejection outlets 14 and recesses for constituting the liquid passages and the liquid chamber 12. The top plate has been produced through ejection molding or another molding process since such processes are convenient for mass-production with low cost. As regards the ejection outlets, the manufacturing accuracy through the molding is not enough, and therefore, they are formed using excimer laser as disclosed in U.S. Pat. No. 5,208,604.

The top plate is produced by injection molding or the like by using female mold, and therefore, the configuration of the mold at portions corresponding to the ink passages is female configuration of the ink passage, and the same applies to the liquid or ink chamber.

Referring to FIGS. 4 and 5, the description will be made as to the mold for injecting molding the top plate 11. FIG. 4 is a sectional view of a mold for the top plate, taken along the ink passage, and FIG. 5 is a perspective view of a block for forming the ink passages. The metal comprises a block 73 for forming the liquid chamber and a block 71 for forming the ink passages 28. At the end of the block 71, an array of projections 72 corresponding to the ink passages 28, is formed. Above the block 71 for forming the ink passages 28, there is a cavity 64 for forming the top plate 11. Into the block 73 for forming the common liquid chamber, a nest pin 65 for forming the ink supply port is inserted.

Designated by 61, 62, 63 and 66, are injector pins for a runner, gate, runner injector pin and orifice plate.

The female portions corresponding to the ink passages (block 71), has a plurality of grooves arranged at the interval of 70.5 μm, for a recording head of 360 dpi resolution, for example, and therefore, the accuracy in the order of microns is required. For this reason, machining is used. On the other hand, the female portion (block 73) corresponding to the ink chamber has to be formed by electric discharge machining or the like to realize three dimensional configuration to meet the design requirement as the recording head. In view of these factors, as for the metal mold for forming the top plate, the block is processed through proper method in consideration of the accuracy and the configuration required for each part of the mold, and the entire metal mold is provided by combining them (FIG. 4).

In the above-described ink jet head, the respective ink passage walls of the top plate and the ink chamber wall are closely contacted to the substrate to form the ink passage spaces and ink chamber space, and therefore, for the metal mold for forming the top plate, the accuracy of assembling the block 71 for forming the ink passage and the block 73 for forming the ink chamber, necessarily requires high accuracy so as to prevent formation of step at the ink passage wall and the ink chamber wall.

The accuracy includes the manufacturing accuracy of the blocks themselves, and in addition, the assembling accuracy in Z direction and surface alignment accuracy in X direction are also important with the result of necessities for assembling skill, measurement skill, consideration to simulation to deviation upon temperature rise of the metal mold.

With such conventional method, contact surfaces between blocks 71 and 73 may be with flashes, depending on the finishing accuracy or arrangement accuracy. If the top plate has the flash, which is projected beyond the ink passage wall surface, the ink passage walls are not sufficiently closely contacted to the base plate, and therefore, when the ink is ejected, a pressure wave is transmitted to an adjacent nozzle or nozzles with the result of instability of ink ejection (cross-talk).

Additionally, even if there is no problem with the initial state of the mold, damage can be given by ejection pressure with continued molding operation, with the result that the flashes are produced.

Particularly, in the case that ink liquid chambers for respective colors are integrally molded to permit low cost color recording, the tendency of flash production increases corresponding to the larger number of ink chamber frames.

SUMMARY OF THE INVENTION

Accordingly, it is a principal object of the present invention to provide an ink jet recording head and manufacturing method therefor, wherein ink jet recording heads can be manufactured with high accuracy and with high yield at low cost, and the reliability is high with high resolution (ejection outlets are arranged at high density).

It is another object Of the present invention to provide an ink jet recording head manufacturing method capable of manufacturing ink jet recording heads without cross-talk, without the necessity for increasing the assembling method of the metal mold.

It is a further object of the present invention to provide an ink jet recording head manufacturing method which is substantially free of cross-talk even if the continuous molding operation is carried out.

According to an aspect of the present invention, there is provided a manufacturing method for an ink jet recording head comprising ink ejection outlets, ink passages in fluid communication with the ink ejection outlets, an ink chamber for supplying ink to the ink passages, energy generating elements for ejecting ink, a grooved top plate having ink passage walls, an ink chamber frame for defining the ink passages and the ink chamber and the ink ejection outlets, a substrate for supporting the energy generating elements, wherein the ink passages and ink chamber are formed by coupling the grooved top plate and the substrate, the improvement residing in that the grooved top plate is molded, and thereafter, a laser machining is effected to a neighborhood of a connecting portion between the ink chamber frame and a the ink passage wall.

According to another aspect of the present invention, there is provided a manufacturing method for an ink jet recording head comprising ink ejection outlets, ink passages in fluid communication with the ink ejection outlets, an ink chamber for supplying ink to the ink passages, energy generating elements for ejecting ink, comprising the steps of: preparing a substrate having the energy generating elements; molding a grooved substrate integrally having ink passage walls, an ink chamber frame and an ejection outlet plate, the ink passage walls defining the ink passages, the ink chamber frame defining the ink chamber and the ejection outlet plate is provided with the ink ejection outlets; projecting a laser beam to the ejection outlet plate to form the ink ejection outlets; masking with a laser beam a neighborhood of a connecting portion between the ink chamber frame and a the ink passage wall; and forming the ink passages and ink chamber by combining the substrate with the ink passage walls and the ink chamber frame of the top plate.

According to an aspect of the present invention, manufacturing, assembling and/or cost problems required conventionally for the metal mold, are essentially solved by the processing with the laser at the portion where the ink passage wall and the ink chamber frame are contacted. According to another aspect of the present invention, the laser processing can be carried out simultaneously with formation of ejection outlets in the orifice plate. In addition to the easing of the required accuracy of the assembling of the metal mold at the initial stage, the maintenance of the step state can be eased after the metal mold is used, so that metal mold maintenance is unnecessary in this respect, so that the productivity is improved.

The present invention is particularly suitably usable in an ink jet recording head and recording apparatus wherein thermal energy by an electrothermal transducer, laser beam or the like is used to cause a change of state of the ink to eject or discharge the ink. This is because the high density of the picture elements and the high resolution of the recording are possible.

The typical structure and the operational principle are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the the bubble, the liquid (ink) is ejected through an ejection outlet to produce at least one droplet. The driving signal is preferably in the form of a pulse, because the development and contraction of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Patent Application NO. 123670/1984 wherein a common slit is used as the ejection outlet for plural electrothermal transducers, and to the structure disclosed in Japanese Laid-Open Patent Application No. 138461/1984 wherein an opening for absorbing pressure wave of the thermal energy is formed corresponding to the ejecting portion. This is because the present invention is effective to perform the recording operation with certainty and at high efficiency irrespective of the type of the recording head.

The present invention is effectively applicable to a so-called full-line type recording head having a length corresponding to the maximum recording width. Such a recording head may comprise a single recording head and plural recording head combined to cover the maximum width.

In addition, the present invention is applicable to a serial type recording head wherein the recording head is fixed on the main assembly, to a replaceable chip type recording head which is connected electrically with the main apparatus and can be supplied with the ink when it is mounted in the main assembly, or to a cartridge type recording head having an integral ink container.

The provisions of the recovery means and/or the auxiliary means for the preliminary operation are preferable, because they can further stabilize the effects of the present invention. As for such means, there are capping means for the recording head, cleaning means therefor, pressing or sucking means, preliminary heating means which may be the electrothermal transducer, an additional heating element or a combination thereof. Also, means for effecting preliminary ejection (not for the recording operation) can stabilize the recording operation.

As regards the variation of the recording head mountable, it may be a single corresponding to a single color ink, or may be plural corresponding to the plurality of ink materials having different recording color or density. The present invention is effectively applicable to an apparatus having at least one of a monochromatic mode mainly with black, a multi-color mode with different color ink materials and/or a full-color mode using the mixture of the colors, which may be an integrally formed recording unit or a combination of plural recording heads.

Furthermore, the ink is usually liquid. It may be, however, an ink material which is solidified below the room temperature but liquefied at the room temperature. Since the ink is controlled within the temperature not lower than 30° C. and not higher than 70° C. to stabilize the viscosity of the ink to provide the stabilized ejection in usual recording apparatus of this type, the ink may be such that it is liquid within the temperature range when the recording signal is the present invention is applicable to other types of ink. In one of them, the temperature rise due to the thermal energy is positively prevented by consuming it for the state change of the ink from the solid state to the liquid state. Another ink material is solidified when it is left, to prevent the evaporation of the ink. In either of the cases, the application of the recording signal producing thermal energy, the ink is liquefied, and the liquefied ink may be ejected. Another ink material may start to be solidified at the time when it reaches the recording material. The present invention is also applicable to such an ink material as is liquefied by the application of the thermal energy. Such an ink material may be retained as a liquid or solid material in through holes or recesses formed in a porous sheet as disclosed in Japanese Laid-Open Patent Application No. 56847/1979 and Japanese Laid-Open Patent Application No. 71260/1985. The sheet is faced to the electrothermal transducers. The most effective one for the ink materials described above is the film boiling system.

The ink jet recording apparatus may be used as an output terminal of an information processing apparatus such as computer or the like, as a copying apparatus combined with an image reader or the like, or as a facsimile machine having information sending and receiving functions.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 6, (b) is a sectional view of an ejecting element illustrating reverse step between the ink passage array and the ink chamber.

DESCRIPTION OF THE PREFERRED EMBODIMENTS

Embodiment 1

Figure 6A:
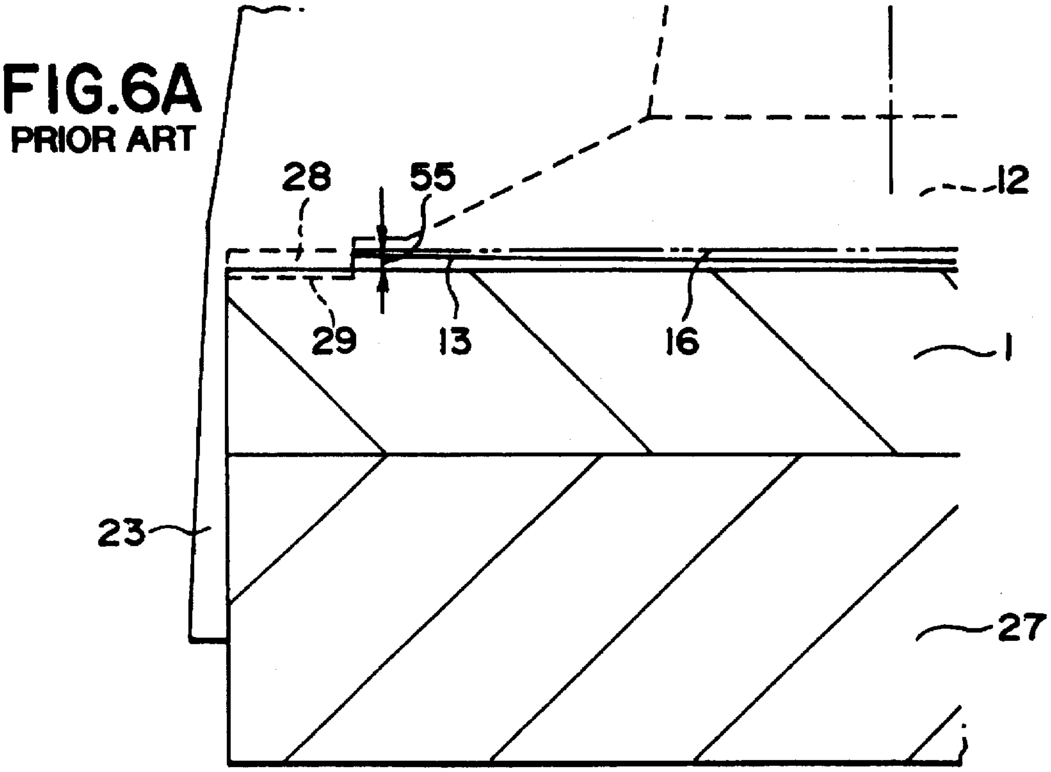
FIG.6A PRIOR ART
FIG. 6, (a) is a sectional view of an ejecting element illustrating forward step between the ink passage array and the ink chamber frame.
Figure 6B:
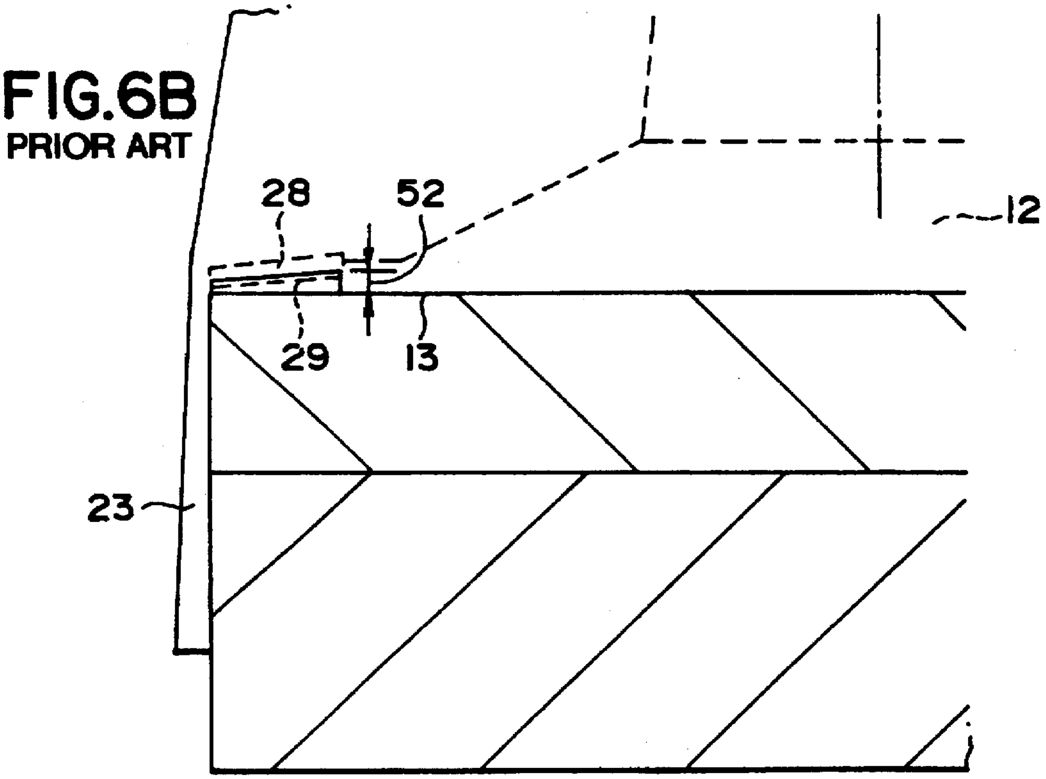
FIG.6B PRIOR ART
Figure 7:
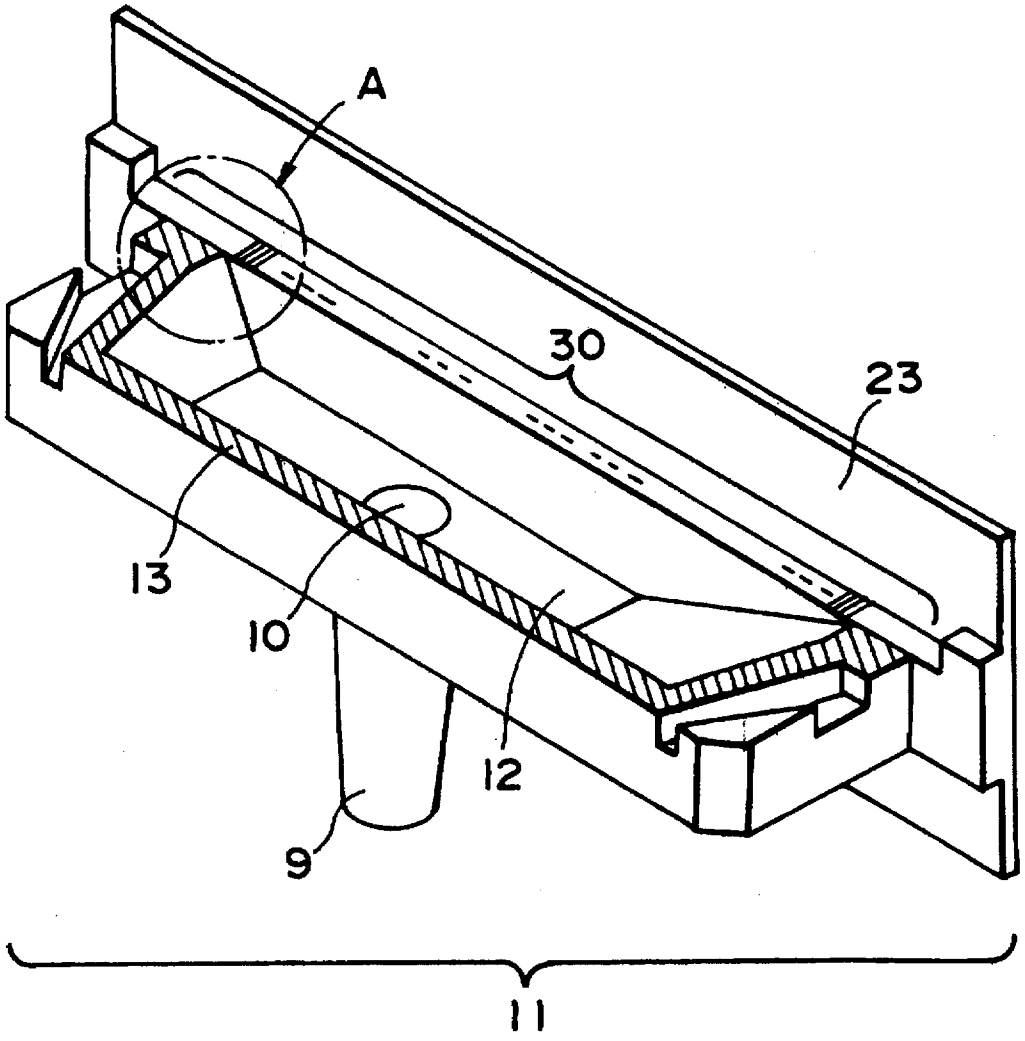
FIG. 7 is a perspective view of a top plate used in Embodiments 1 and 3 of the present invention.
Figure 8A:
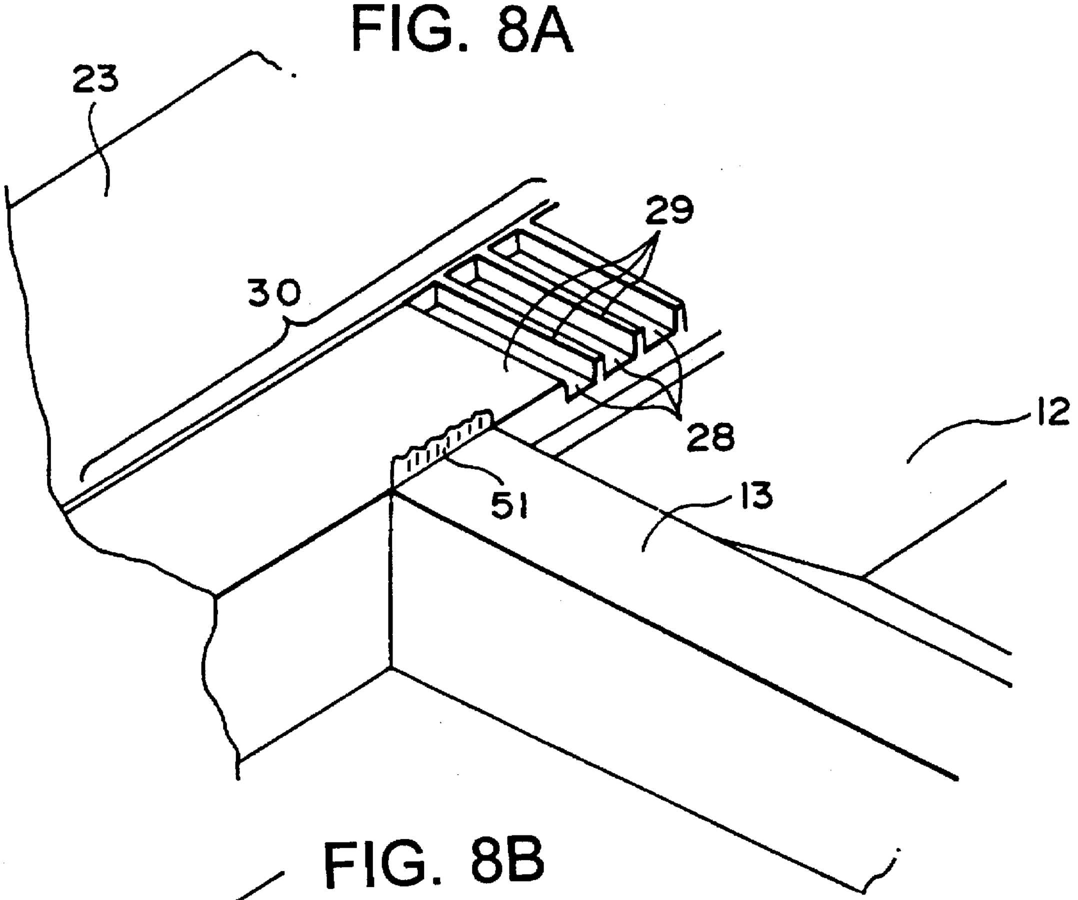
FIGS. 8(*a*) and 8(*b*) are perspective views of a part illustrating before and after flash removal in Embodiment 1 of the present invention.
Figure 8B:
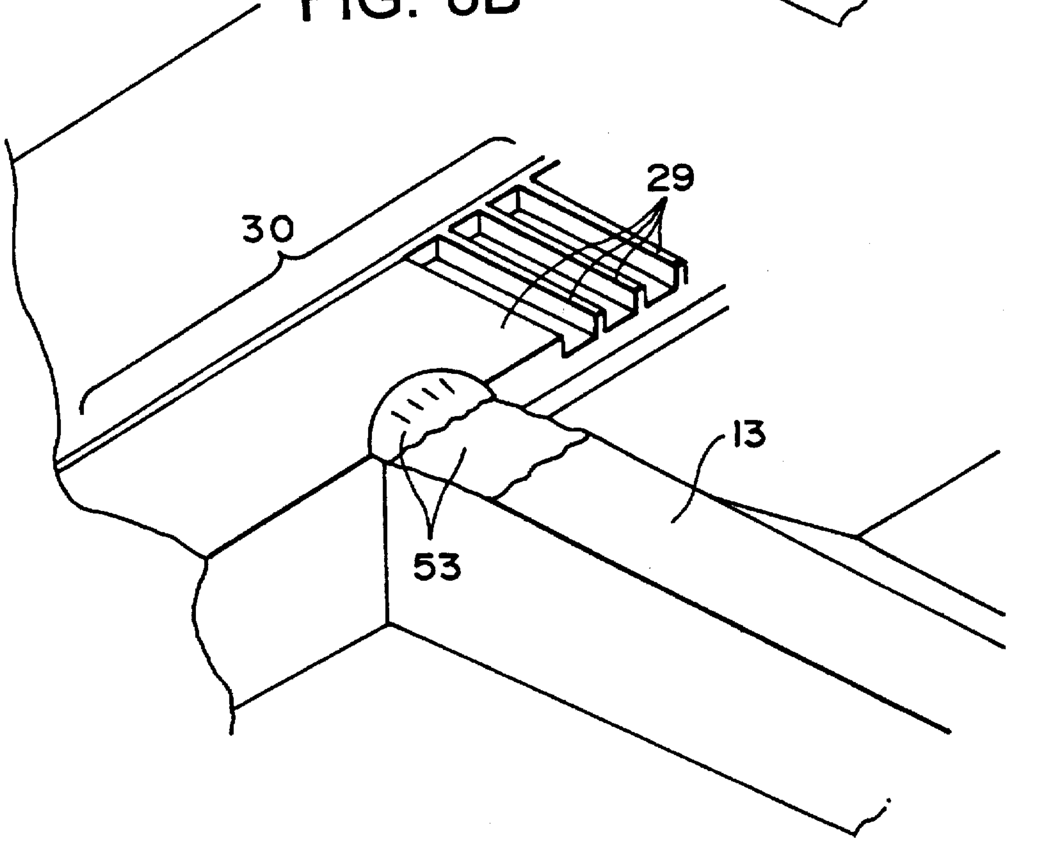

FIG. 6, (a), (b) illustrate conventional examples. FIG. 8, (b) illustrates a feature of the present invention, and FIGS. 7, 8, (a), (b) generally illustrate a top plate used in this embodiment.

In the description of this embodiment, an ink jet recording head is provided with 2 or 5 ink ejection outlets, but the present invention is applicable to a high density multi-array ink jet recording head having a larger number of ejection outlets. The present invention is applicable also to a recording head integrally having ink passages ejecting different volumes of ink droplets. An example thereof has 64 black ink nozzle ejecting 80 ng ink droplet, and 24 nozzles for each of yellow, magenta and cyan inks capable of ejecting 40 ng ejection volume on a line, for 360 dpi printing (Embodiment 2).

The substrate 1 is of a silicone wafer having a thickness of 0.625 mm. On the substrate 1, heat generating resistors of $HfB_2$, and wiring and electrode (material A1) for the heat generating resistors, are formed in this order by a sputtering machine. Thereafter, patterning is carried out through the process similar to a semiconductor manufacturing process, including photosensitive resist application, pattern exposure, development and resist removal. By doing so, electrothermal transducer element constituted by the heat generating resistors, wiring and electrodes, are formed on the same side of the substrate at predetermined regular intervals. For the purpose of improvement in the durability, various function layers such as electrically insulative film of $SiO_2$, protection film of Ta, electrode oxidation preventing film Au or the like, are formed.

Figure 4:
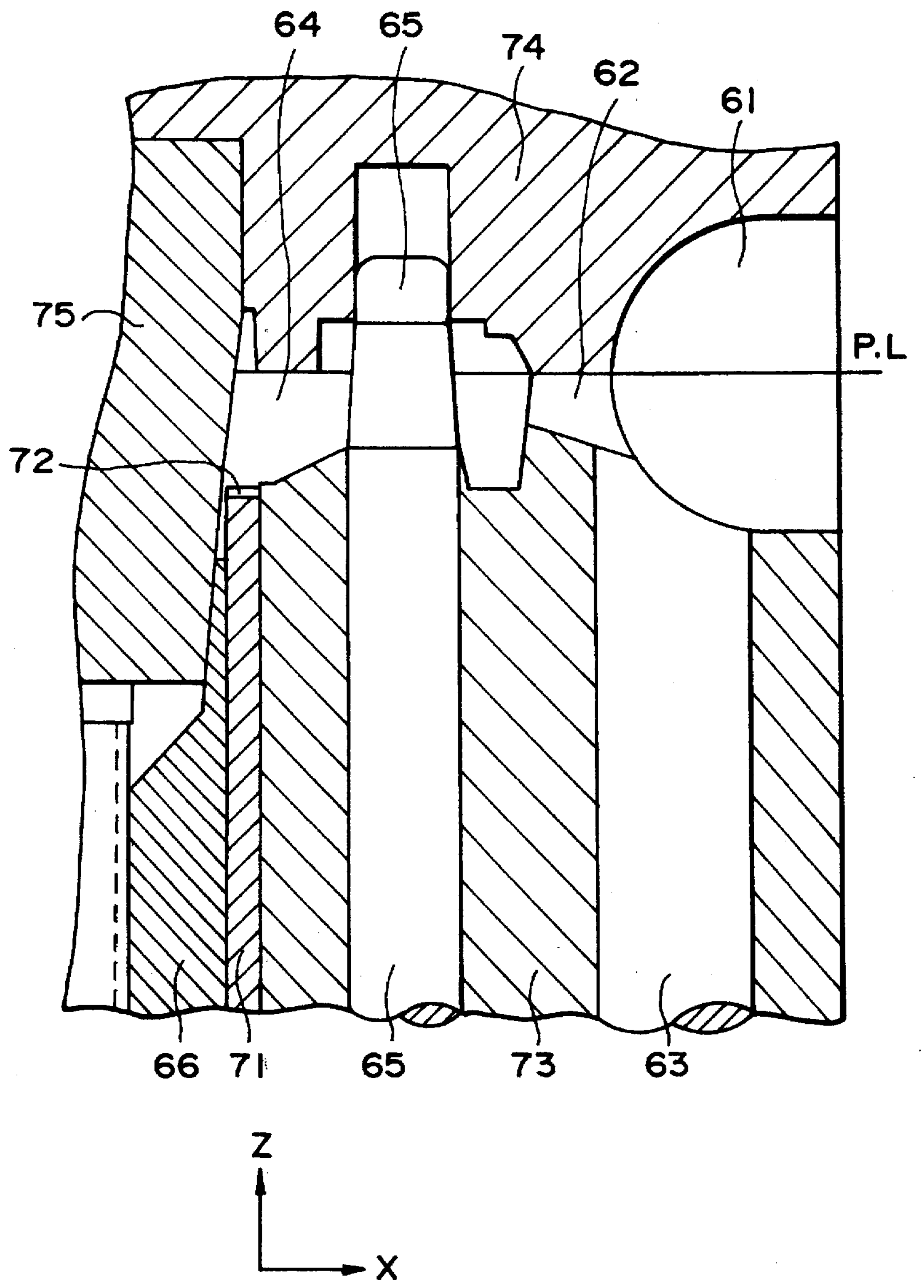
FIG. 4 is a sectional view of a metal mold for injection molding of a top plate, taken along an ink passage.
Figure 5:
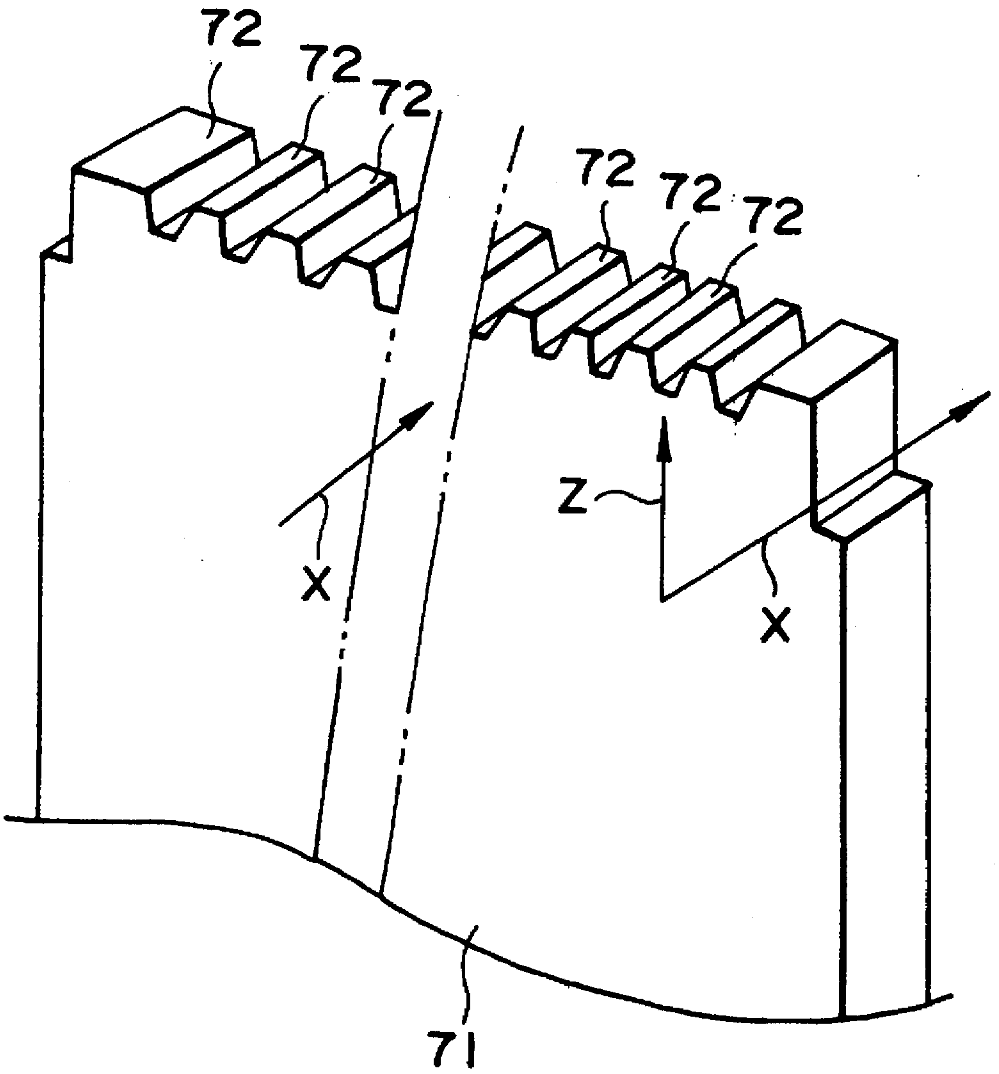
FIG. 5 is a perspective view of a block for forming ink passage array.

Subsequently, blocks 71, 73, 74, 75 or the like having a plurality of grooves as shown in FIG. 5, are set in the metal mold to provide a cavity 64 (FIG. 4), and them, the resin material is injected into the cavity 64, using injection molder. Thereafter, the molded material is taken out, and it is subjected to a gate process, thus producing a top plate 11.

Here, the use is made with polysulfone as the resin material having plastization temperature of approx. 400° C. with metal mold temperature of approx. 150° C.

The top plate 11 thus produced has an array 30 of ink passages at 70.5 μm intervals. Between a surface of the ink passage wall 29 to be contacted with the substrate 1 and a surface of the ink chamber frame 13, there is a proper forward step 55, more particularly, the ink passage wall is higher than the ink chamber frame by approx. 5 μm. However, there is a small gap between the block 71 for providing the array 30 of the ink passages and the block 73 for providing the ink chamber or the like, the gap being inevitable to permit setting of the blocks, and therefore, a flash 51 having a height of approx. 10 μm is produced (FIG. 8, (a)).

When the ink ejection element is assembled using such a top plate, the ink passage wall is not sufficiently closely contacted to the substrate 1 due to the projected flash beyond the ink passage wall surface. If this occurs, the problem in the printing arises (such as cross-talk).

In this Embodiment 1, an excimer laser beam is projected to the contacting and crossing portion between the ink passage wall 29 and the ink chamber frame 13 of the top plate 11, thus removing the flash through abrasion. The processing or machining is schematically shown in FIG. 8, (a) and (b), where the portion designated by a reference numeral 53 is the portion illuminated by an excimer laser, where the flash is removed.

Figure 15:
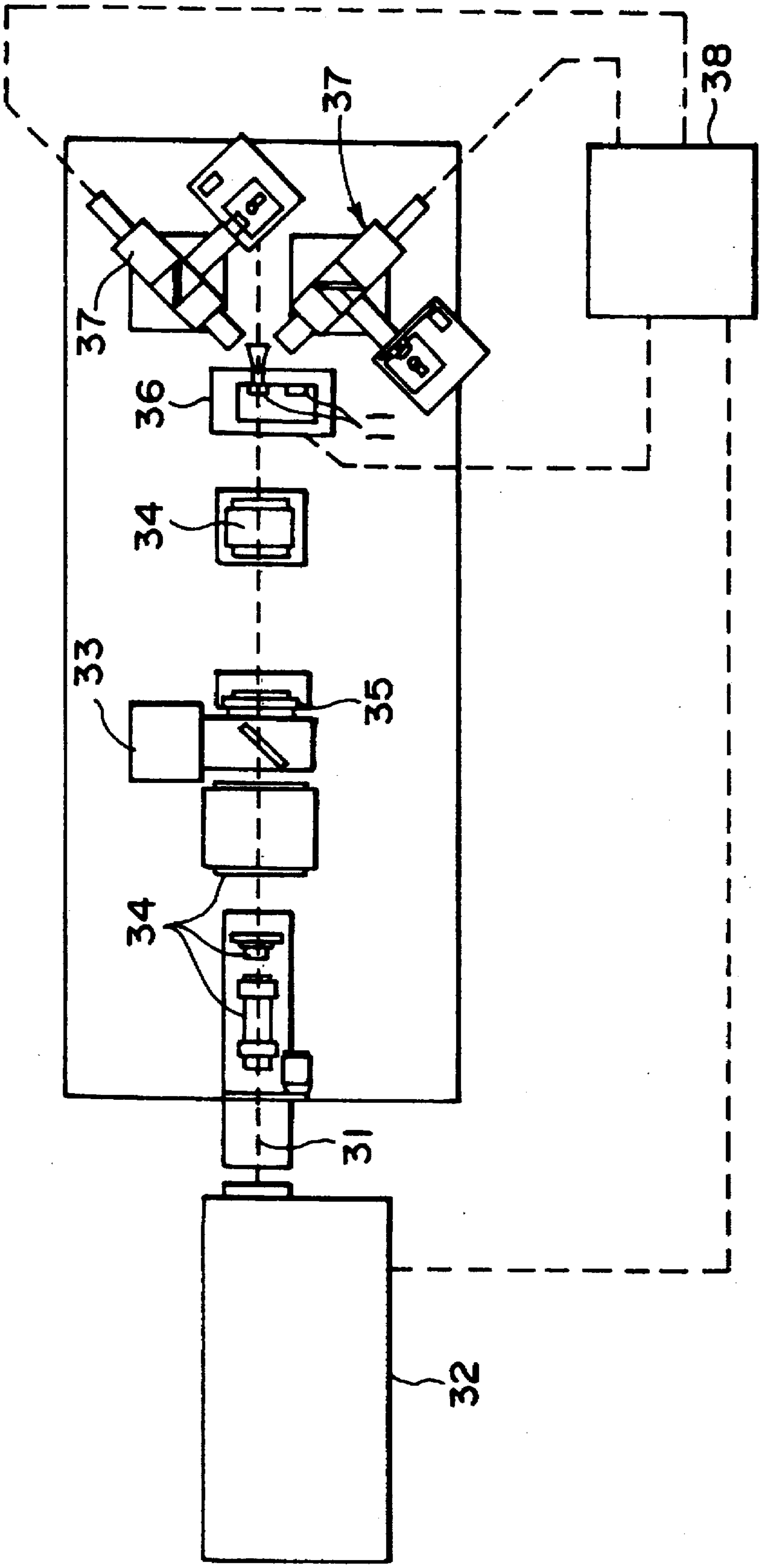
FIG. 15 illustrates an excimer laser machining apparatus according to an embodiment of the present invention.

The structure of the excimer laser machining apparatus is as shown in FIG. 15, in which a reference numeral 31 designates an excimer laser beam, 32 is a main assembly of the excimer laser apparatus, 33 is a half mirror and a power meter for monitoring the power of the laser, 34 is an optical lens system for projecting the excimer laser beam, corresponding to the ejection outlet pattern, 34 is a mask having a pattern of the flash removing portions, 36 is a work piece moving and supporting table, 37 is an observation system for image processing, and 38 is a control system for controlling a laser oscillation timing or work piece positioning or the like.

As for the machining conditions, KrF excimer laser (wavelength of 248 nm) beam is projected at an angle of 45 degrees relative to the surface of the ink chamber frame, at the repetition frequency of 100 pps and with the pulse energy density of 600 $mJ/cm^2$. With these conditions, the flash 51 having a height of approx. 10 μm was removed by 50 pulses. By the abrasion processing, some sub-products are deposited, which, however, could be reduced by blowing helium gas simultaneously with the abrasion.

Figure 1:
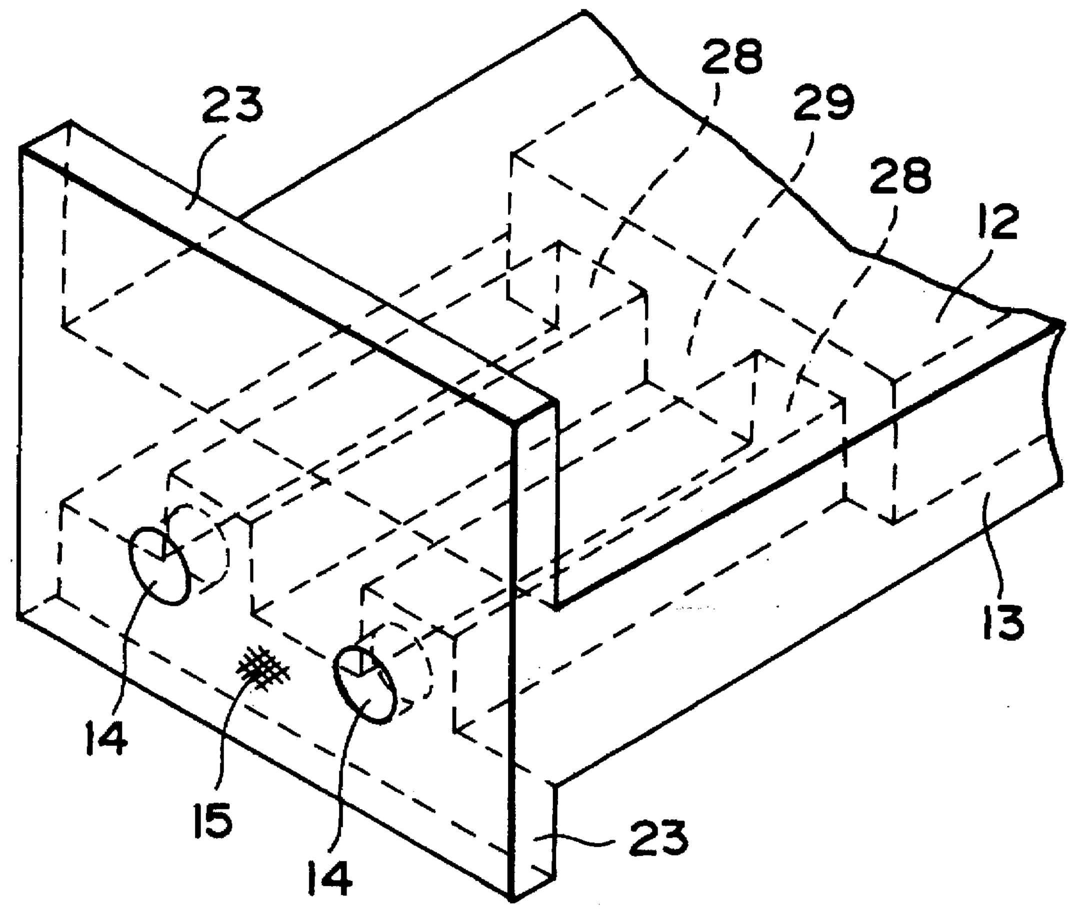
FIG. 1 is an enlarged schematic view of a top plate.
Figure 2:
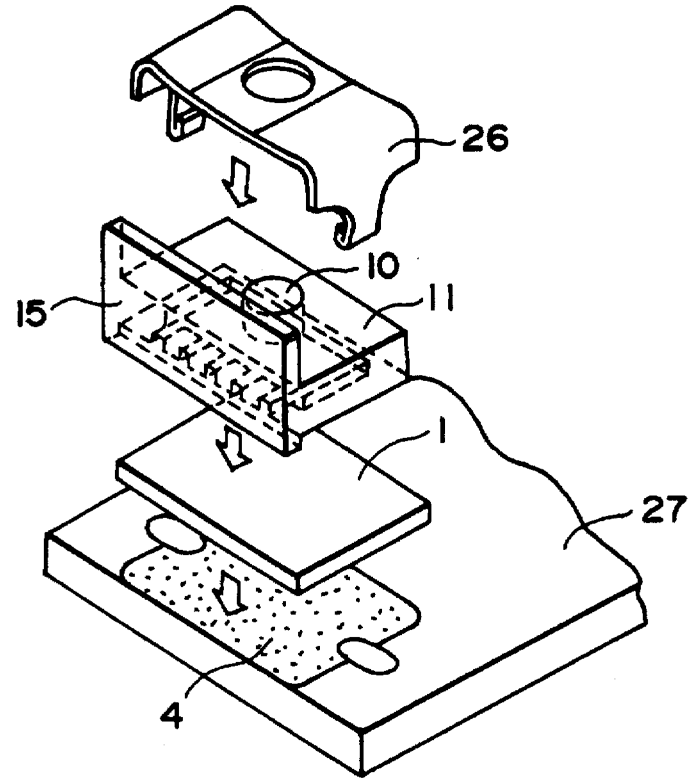
FIG. 2 PRIOR ART
FIG. 2 is a exploded perspective view of an example of an ink jet recording head.
Figure 3:
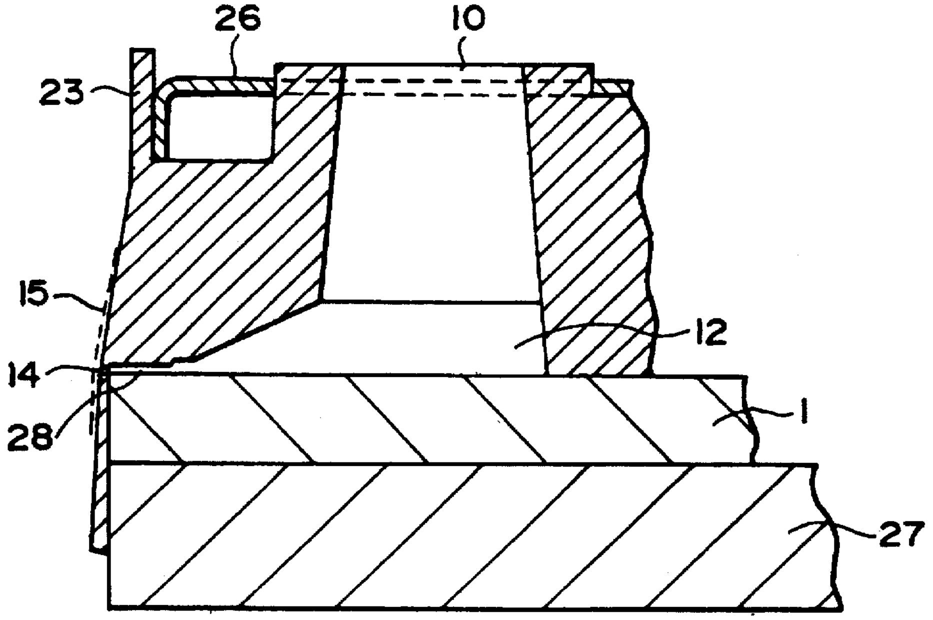
FIG. 3 PRIOR ART
FIG. 3 is a sectional view of an ink jet recording head taken along an ink passage.

Subsequently, the orifice plate 23 of the top plate 11 is ink ejection outlet formation by application of ink repelling material and using excimer laser. As shown in FIG. 2, the substrate 1 is die-bonded on the base plate 27. The processed top plate 11 is aligned so that the ink passages 28 and the ink ejection energy generating elements (not shown) correspond to each other, respectively. Then, they are fixed by a confining spring 26.

Although not shown in FIG. 2, a silicon sealant, TSE 399 (3000 cps) available from Toshiba Silicone Kabushiki Kaisha, Japan is applied to the connecting region or the like between the ink chamber frame 13 and the substrate 1, and thereafter, a barrier for the ink to be supplied to the ink chamber is formed.

Using the ejection elements of the recording head thus produced, electric connection through wire bonding or the like and ink supply system connection, are carried out. Then, the ejection performance test and printing durability test are carried out, after it is assembled into a printer. Since the flashes are removed before assembled into a recording head, and therefore, the shot position accuracy and dot diameters of the ejected droplet, are satisfactory to meet the design requirements, and therefore, the reliability is high. In the conventional example, the gap is formed between the blocks 71 and 73 in the metal mold for the formation of the top plate with the result of production of the flash in the molded top plate. This leads to improper printing. Therefore, maintenance operations for the metal mold (adjustments of surfaces of the blocks and reassembling and adjustment), are required.

According to the present invention, however, the proper manufacturing is established without consideration to the production of the flashes.

Additionally, according to this invention, the excimer laser is projected to the neighborhood of the flashes, and therefore, the unintended portion is also engraved, but the depth thereof is approx. 5 μm. This does not give rise to the problem that the sealant enters the ink passages, since the silicone sealant is permitted to entire the ink passages only if the gap is 10–30 μm approximately.

In this embodiment, the abrasion machining is carried out using excimer laser. Depending on the structure of the top plate or the position or size of the flashes to be removed, it may be YAG laser or the like.

Embodiment 2

Figure 9:
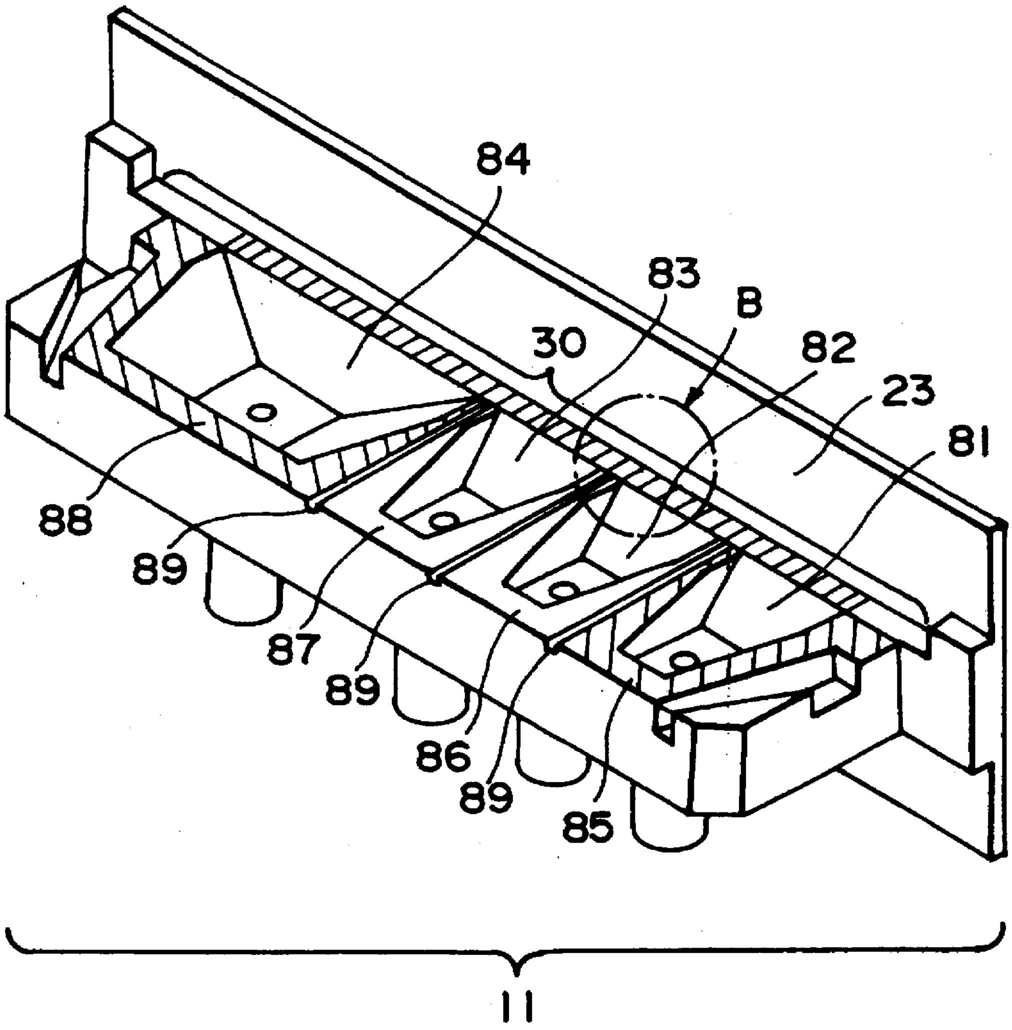
FIG. 9 is a perspective view of a top plate having a plurality of ink chambers according to Embodiment 2 of the present invention.
Figure 10:
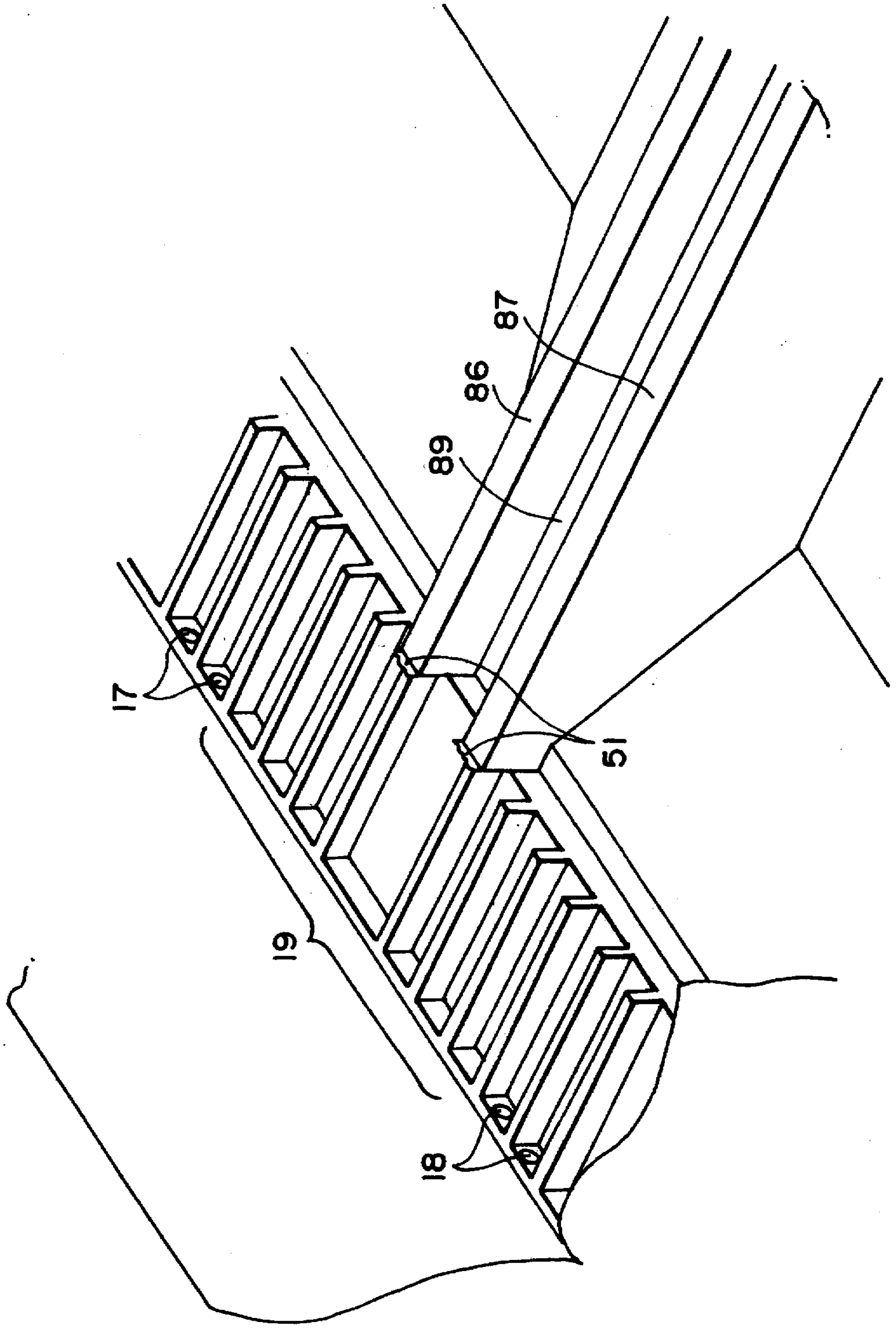
FIG. 10 is a perspective view illustrating the state before flash removal on the plurality of ink chamber frames, according to Embodiment 2 of the present invention.
Figure 11A:
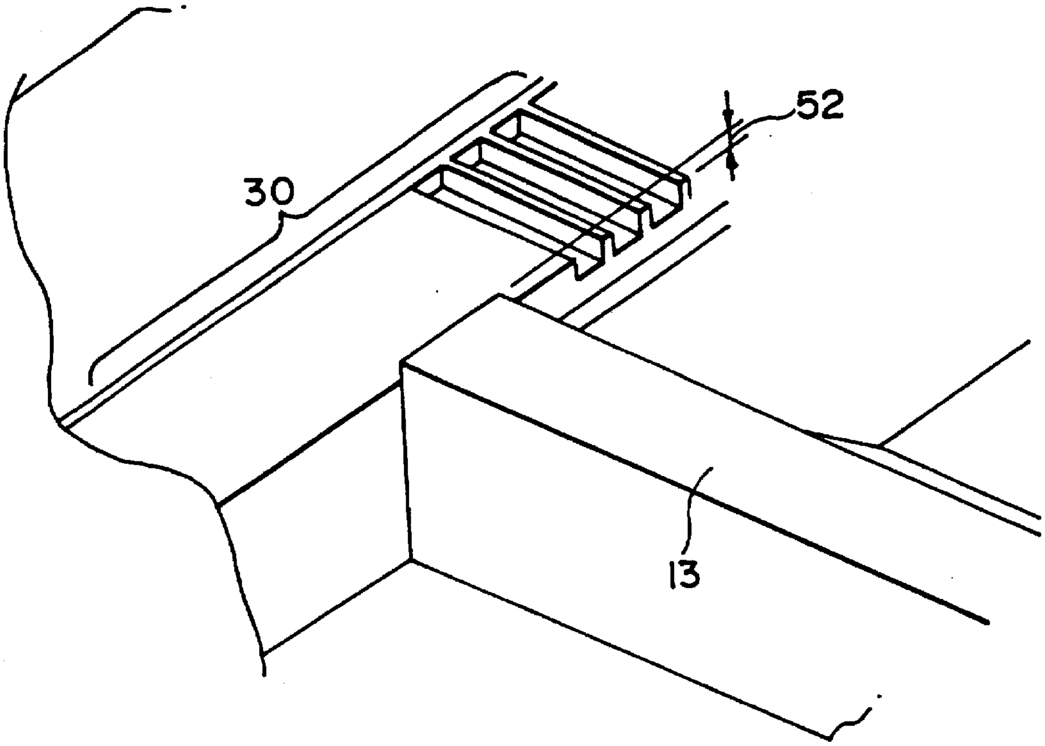
FIGS. 11(*a*) and 11(*b*) are perspective view illustrating states before and after removal of the reverse step, according to Embodiment 3 of the present invention.
Figure 11B:
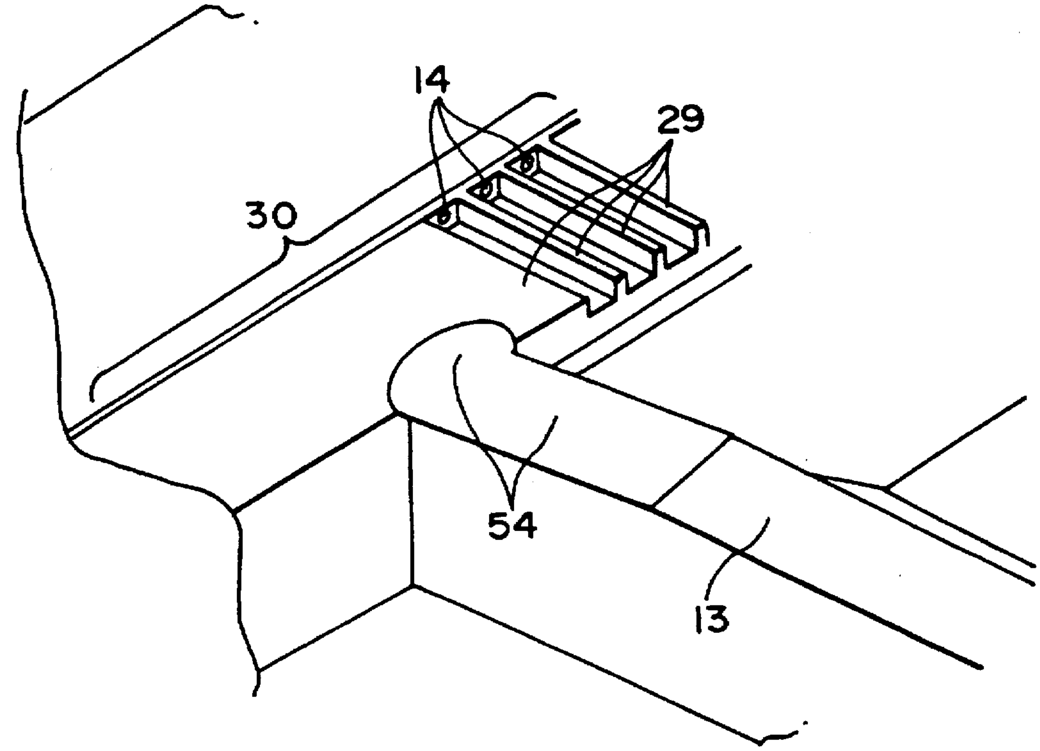

FIGS. 9 and 10 illustrate Embodiment 2. A top plate 11 for four integral 360 dpi recording head (FIG. 9) is produced through the injection molding process similar to Embodiment 1. The recording head includes, as a unit, a plurality ink chambers, 64 black ink nozzles of 80 ng ejection volume, 24 nozzles of 40 ng ejection volume for each of yellow, magenta and cyan colors, and 8 dummy nozzles between adjacent color nozzles. As for the forming method of the top plate integrally having the ink passage, the ink chamber or the like, the method is not necessarily limited to the injection molding, but may be cast molding method or transfer molding method using a similar metal mold.

The top plate of this embodiment has four different ink chambers as shown in FIG. 9, and therefore, it has respective liquid chamber frames 85, 86, 87 and 88. Similarly to Embodiment 1, the flash tends to occur between the contact surfaces between the block 71 and the block 73, that is, the crossing or contacting surfaces between the ink chamber wall and the ink passage wall in the top plate.

In the case of the top plate having a plurality of ink chambers, the advantageous effects of the removal of the flashes were confirmed, for the same reasons as with Embodiment 1.

Embodiment 3

FIG. 4 illustrates Embodiment 3.

Using the metal mold of Embodiment 1, 10,000 shot molding operations are continuously carried out, and it has been found that the block 71 is deviated relative to the block 73 by the ejection pressure damage during the continuous molding operation, with the result that the height of the ink chamber frame 13 of the molded top plate 11 is higher than the ink passage walls (so-called reverse step). As has been described with FIG. 6, (a), the ink passage walls 29 can be sufficiently closely contacted to the substrate 1 by the plastic deformation of the ink liquid chamber by the pressure of the confining spring, but the close contactness is not maintained in the case of the reverse step. This is because, the length of the ink chamber is at least several mm, but the length of the ink passage is one tenth approximately.

Even if the ejection element is manufactured using such a top plate, the insufficient close contact is established between the ink passage wall 29 and the substrate 1 as shown in FIG. 6, (b), and therefore, satisfactory ejection performance can be provided. In this embodiment, the machining using laser is effected on the molded top plate having the reverse step.

This correction machining is carried out simultaneously with the excimer laser machining for forming ink ejection outlets on an orifice plate portion of the top plate.

Figure 14:
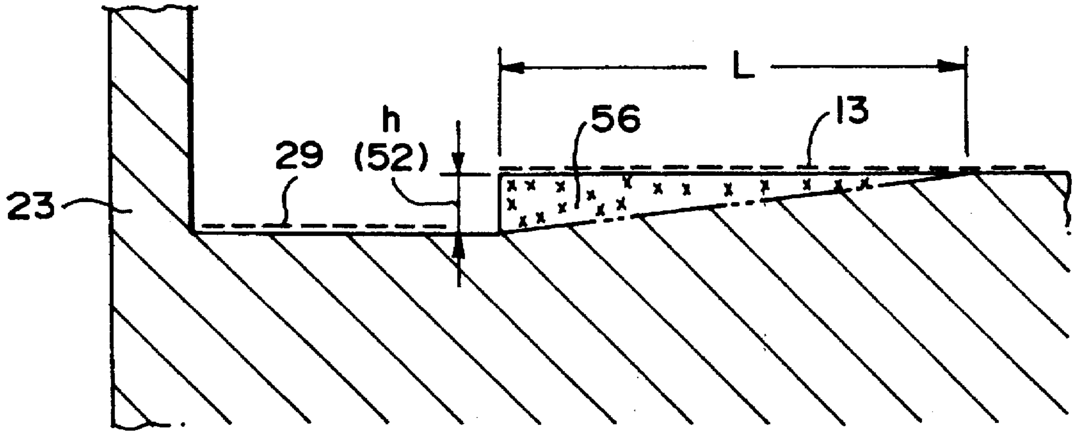
FIG. 14 illustrates a structure used in Embodiment 3.

The top plate 11 is subjected to the excimer laser at the reverse stepped portions so that a triangular cross-section part as shown in FIG. 14 is removed. The laser projection is carried out at an angle of 10 degrees relative to the ink chamber frame surface, the angle being the same as when the ejection outlets are formed.

Figure 12:
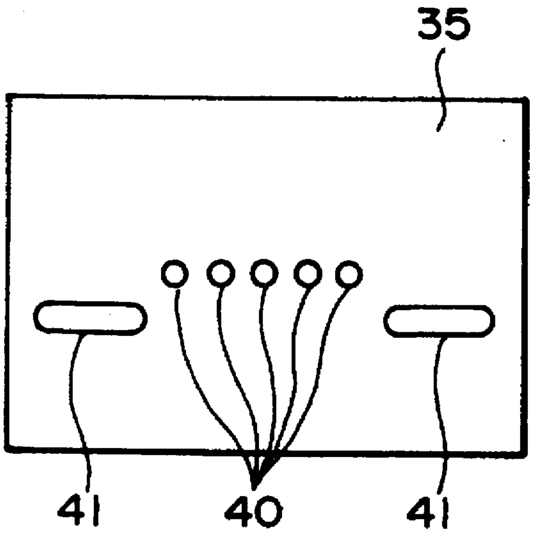
FIG. 12 illustrates a mask for laser machining according to Embodiment 3 of the present invention.
Figure 13:
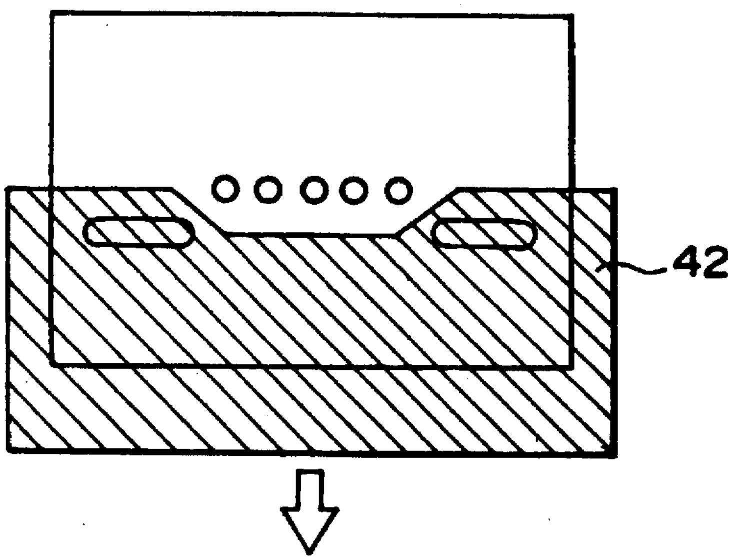
FIG. 13 illustrates a shutter for controlling a laser application period for the correction of the reverse step, according to Embodiment 3 of the present invention.

The laser mask is as shown in FIG. 12. The ink ejection outlets are through outlets, but the flash removing machining is partial removal, and therefore, the number of pulses required for the correction is smaller than the number of pulses projected for the ink ejection outlet formation. Therefore, a shutter is provided to cover the portions to be corrected during the laser projection so as to control the number of pulses applied to the portion to be corrected depending on the time period of the opening state of the shutter after the laser beam is emitted (FIG. 13).

Here, the description is made as to the case of the reverse step, but the same method can be used for the removal of the flash.

The range of the laser projection without movement of the top plate relative to the laser beam, is different depending on the beam size of the laser beam source, the energy density required for the machining, the optical system used or the like. However, from the standpoint of the productivity, it is preferable that the machining is completed without movement of the top plate and within the laser beam projection period for the ink ejection outlet formation.

Therefore, the investigations have been made as to how much the reverse step is to be removed to satisfy the sufficient close contact between the ink passage walls 29 and the substrate 1 after the mounting of the confining spring, to satisfy the required ink ejection performance and to prevent the sealant from entering the ink chamber in the sealing material application process. It has been found that within the range of 100–600 μm of the ink passage length which is realistic in ink jet recording heads, if the triangular cross-sectional portion in the range not less than 20 times the height of the reversed step, is removed, the ink passage walls 29, the ink chamber frame after the correcting machining, and uncorrected portions of the ink chamber frame, are all sufficiently closely contacted to the substrate 1.

According to Embodiments 1–3, the machining accuracies of the blocks set in the metal mold can be eased in a top plate integrally having ink passages or the like and to be formed through injection molding or cast molding or the like. Additionally, using the laser machining, the recording head manufacturing can be accomplished property both at the initial stage having high positional accuracy and upon stepwise deviation during continuous formation.

By this, the initial cost of the metal mold can be reduced, and the maintenance cost can be reduced, and the productivity reduction due to the maintenance can be avoided. By the simultaneous machining with the ink ejection outlet formation, the machining operations are carried out on the basis of one positioning and during the same period, so that the cost increase is not required. Thus, the productivity improvement and cost reduction is possible in the ink jet recording head manufacturing.

As described in hereinbefore, the sub-product during the abrasion machining with the excimer laser beam is not a problem, and therefore, the helium gas is not necessarily used as in Embodiment 1.

According to the present invention, the recording head can be manufactured with high yield, high productivity, high accuracy and lost cost. Therefore, the advantageous of the present invention is particularly remarkable for a recording head of an ink jet recording type in which the ink droplets are ejected using thermal energy, wherein the ink ejection energy generating elements are integrally formed on the substrate.

The present invention is not limited to a monochromatic (black) recording head, but it is applicable to color recording heads. The present invention is neither limited to a serial scan type recording head, but is applicable to a so-called full-line type recording head covering a maximum recording width of the recording material. The ink is not limitedly liquid, but may be an ink which is solid, but is liquefied or softened upon ink ejection.

The color recording head or full-line type recording head may be constituted by combining a plurality of recording heads, or may be the one integrally formed.

While the invention has been described with reference to the structures disclosed herein, it is not confined to the details set forth and this application is intended to cover such modifications or changes as may come within the purposes of the improvements or the scope of the following claims.

What is claimed is:

1. A manufacturing method for manufacturing an ink jet recording head comprising a plurality of ink ejection outlets, a plurality of ink passages in fluid communication with the ink ejection outlets, an ink chamber for supplying an ink to the ink passages, a plurality of energy generating elements for ejecting the ink, a grooved top plate having a plurality of ink passage walls, an ink chamber frame which defines the ink passages and the ink chamber and said ink ejection outlets, a substrate for supporting the energy generating elements, the ink passages and ink chamber being formed by coupling the grooved top plate and the substrate, comprising the steps of:

molding the grooved top plate, and thereafter, effecting a laser machining at a portion of the molded grooved top plate at which the ink chamber frame and a given said ink passage wall contact each other and which portion is adjacent to a coupling portion relative to the substrate; and coupling the laser machined molded grooved top plate to the substrate at said coupling portion, thereby forming the ink jet recording head.

2. A method according to claim 1, wherein the laser is an excimer laser.

3. A method according to claim 1, wherein the laser machining substantially simultaneously forms the ink ejection outlets.

4. A method according to claim 3, further comprising the step of providing a mask having a first mask pattern for the laser machining at the connecting portion between the ink chamber frame and the grooved top plate and a second mask pattern for forming the ink ejection outlets, and wherein the first mask pattern is closed and opened by a shutter.

5. A method according to claim 1, wherein said grooved top plate is formed by injection molding.

6. A method according to claim 1, wherein said energy generating elements comprise electrothermal transducer elements.

7. A method according to claim 1, wherein said laser machining is effected so that the ink jet recording head satisfies an expression $L>20\times h$, where h is a height of a reverse step formed at the connecting portion, and L is a laser machining length.

8. A manufacturing method for manufacturing an ink jet recording head comprising a plurality of ink ejection outlets, a plurality of ink passages in fluid communication with the ink ejection outlets, an ink chamber for supplying an ink to the ink passages, a plurality of energy generating elements for ejecting the ink, comprising the steps of:

preparing a substrate having the energy generating elements;

molding a grooved top plate integrally having a plurality of ink passage walls, an ink chamber frame and an ejection outlet plate, the ink passage walls defining said ink passages, the ink chamber frame defining said ink chamber and the ejection outlet plate having said ink ejection outlets;

projecting a laser beam onto the ejection outlet plate to form the ink ejection outlets;

machining with a laser beam a portion of the molded grooved top plate at which the ink chamber frame and a given said ink passage wall contact each other, said portion is adjacent to a coupling portion, relative to the substrate; and forming said ink passages and said ink chamber by joining the substrate at said coupling portion with the ink passage walls and the ink chamber frame of the top plate, thereby forming the ink jet recording head.

9. A method according to claim 8, wherein the laser is an excimer laser.

10. A method according to claim 8, wherein the laser machining substantially simultaneously forms the ink ejection outlets.

11. A method according to claim 10, further comprising the step of providing a mask having a first mask pattern for the laser machining at the connecting portion between the ink chamber frame and the grooved top plate and a second mask pattern for forming the ink ejection outlets, and wherein the first mask pattern is closed and opened by a shutter.

12. A method according to claim 8, wherein said grooved top plate is formed by injection molding.

13. A method according to claim 8, wherein said energy generating elements comprise electrothermal transducer elements.

14. A method according to claim 8, wherein said laser machining is effected so that the ink jet recording head satisfies an expression $L>20\times h$, where h is a height of a reverse step formed at the connecting portion, and L is a laser machining length.

* * * * *

UNITED STATES PATENT AND TRADEMARK OFFICE
CERTIFICATE OF CORRECTION

PATENT NO. : 5,694,684

DATED : December 9, 1997

INVENTOR(S) : HAJIME YAMAMOTO

It is certified that error appears in the above-identified patent and that said Letters Patent is hereby corrected as shown below:

COLUMN 2

Line 3, "portions" should read --portion--.
Line 58, "Of" should read --of--.

COLUMN 3

Line 14, "a the" should read --the--.
Line 30, "a the" should reead --the--.

COLUMN 4

Line 2, "the" (second occurrence) should be deleted.
Line 19, "NO." should read --No.--
Line 53, "be a" should read --be--.

UNITED STATES PATENT AND TRADEMARK OFFICE
CERTIFICATE OF CORRECTION

PATENT NO. : 5,694,684

DATED : Deceber 9, 1997

INVENTOR(S) : HAJIME YAMAMOTO

It is certified that error appears in the above-identified patent and that said Letters Patent is hereby corrected as shown below:

COLUMN 5

Line 2, "is the" should read --in the--."
Line 33, "is a" should read --is an--.
Line 42, "6, (a)" should read --6(a)--.
Line 45, "6, (b)" should read --6(b)--.
Line 59, "view" should read --views--.

COLUMN 6

Line 8, "FIG." should read --FIGS.-- and "FIG. 8," should read --FIG. 8--.
Line 10, "8," should read --8--.
Line 41, "them," should read --then.--
Line 59, "8," should read --8--.

COLUMN 7

Line 3, "8," should read --8--.

COLUMN 8

Line 38, "6," should read --6--.
Line 41, "contactness" should read --contact--.
Line 48, "6," should read --6--.

CERTIFICATE OF CORRECTION

PATENT NO. : 5,694,684

DATED : December 9, 1997

INVENTOR(S) : HAJIME YAMAMOTO

It is certified that error appears in the above-identified patent and that said Letters Patent is hereby corrected as shown below:

COLUMN 9

Line 33, "property" should read --properly--.
Line 45, "in" should be deleted.
Line 51, "advantageous" should read --advantages--.
Line 52, "is" should read --are--.

Signed and Sealed this

Ninth Day of June, 1998

Attest:

BRUCE LEHMAN

*Attesting Officer*

*Commissioner of Patents and Trademarks*